United States Patent
Kim et al.

(10) Patent No.: US 11,516,637 B2
(45) Date of Patent: Nov. 29, 2022

(54) METHOD AND APPARATUS FOR PROVIDING INFORMATION FOR VEHICLE COMMUNICATION SERVICES

(71) Applicant: Samsung Electronics Co., Ltd., Suwon-si (KR)

(72) Inventors: Sunghoon Kim, Suwon-si (KR); Jungshin Park, Suwon-si (KR); Hoyeon Lee, Suwon-si (KR); Jungje Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/587,448

(22) Filed: Sep. 30, 2019

(65) Prior Publication Data

US 2020/0112841 A1  Apr. 9, 2020

(30) Foreign Application Priority Data

Oct. 5, 2018  (KR) .......................... 10-2018-0119316

(51) Int. Cl.
| | | |
|---|---|---|
| *G06F 15/16* | (2006.01) | |
| *H04W 4/44* | (2018.01) | |
| *H04W 8/06* | (2009.01) | |
| *H04W 28/02* | (2009.01) | |
| *H04W 4/06* | (2009.01) | |
| *H04W 4/46* | (2018.01) | |
| *H04W 8/00* | (2009.01) | |

(52) U.S. Cl.
CPC ............... *H04W 4/44* (2018.02); *H04W 4/06* (2013.01); *H04W 4/46* (2018.02); *H04W 8/005* (2013.01); *H04W 8/06* (2013.01); *H04W 28/0268* (2013.01)

(58) Field of Classification Search
CPC .......... H04W 4/44; H04W 4/46; H04W 4/06; H04W 8/005; H04W 8/06; H04W 28/0268
USPC ........................................................ 709/217
See application file for complete search history.

(56) References Cited

U.S. PATENT DOCUMENTS

| | | | |
|---|---|---|---|
| 10,172,009 B1 * | 1/2019 | Altay | H04W 12/08 |
| 2017/0288886 A1 | 10/2017 | Atarius et al. | |
| 2018/0255531 A1 | 9/2018 | Xu et al. | |

(Continued)

FOREIGN PATENT DOCUMENTS

| | | |
|---|---|---|
| EP | 3 759 950 | 10/2019 |
| EP | 3 745 746 A1 | 12/2020 |

(Continued)

OTHER PUBLICATIONS

International Search Report dated Jan. 29, 2020, issued in International Application No. PCT/KR2019/012721.

(Continued)

*Primary Examiner* — Imad Hussain
(74) *Attorney, Agent, or Firm* — Jefferson IP Law, LLP (57) ABSTRACT

A method, performed by an access and mobility management function (AMF), of providing information for a vehicle-to-everything (V2X) service is provided. The method includes receiving, from a user equipment (UE), a registration request message including information indicating that the UE is a V2X terminal, selecting, based on the registration request message, a policy control function (PCF) supporting the V2X service, receiving V2X policy information from the selected PCF, and providing the V2X policy information to a base station.

20 Claims, 5 Drawing Sheets

(56) References Cited

U.S. PATENT DOCUMENTS

| | | | |
|---|---|---|---|
| 2018/0270778 A1 | 9/2018 | Bharatia | |
| 2018/0270840 A1 | 9/2018 | Griot et al. | |
| 2019/0045421 A1* | 2/2019 | Shah | H04W 40/02 |
| 2019/0146096 A1 | 5/2019 | Jin et al. | |
| 2019/0230645 A1* | 7/2019 | Cheng | H04W 12/08 |
| 2019/0306754 A1* | 10/2019 | Shan | H04W 8/06 |
| 2020/0178048 A1* | 6/2020 | Kim | H04W 4/40 |
| 2020/0280888 A1* | 9/2020 | Xu | H04L 29/06 |

FOREIGN PATENT DOCUMENTS

| | | | | |
|---|---|---|---|---|
| KR | 10-2014-0073074 A | | 6/2014 | |
| KR | 10-2017-0113445 A | | 10/2017 | |
| KR | 10-2018-0034970 A | | 4/2018 | |
| KR | 10-2018-0038060 A | | 4/2018 | |
| WO | 2018/022225 A1 | | 2/2018 | |
| WO | WO-2020200028 A1 | * | 10/2020 | H04W 24/02 |

OTHER PUBLICATIONS

Intel, Solution for key issue #6, 3GPP TSG SA WG2 Meeting #126, S2-182069, Feb. 26-Mar. 2, 2018, Montreal, Canada.

Nokia et al., 23.501: Editorial corrections and EN Removal, SA WG2 Meeting #124, S2-179619, Nov. 27-Dec. 1, 2017, Reno, Nevada, USA.

Catt, Service authorization and Provisioning based on UE V2X capability, SA WG2 Meeting #128bis, S2-188160, Aug. 20-Aug. 24, 2018, Sophia Antipolis, France.

Huawei et al., Update of Solution#5 for eV2X parameters provision, SA WG2 Meeting #127bis, S2-185341, May 28-Jun. 1, 2018, Newport Beach, CA, USA.

Extended European Search Report dated Aug. 30, 2021, issued in European Patent Application No. 19868485.4.

Korean Office Action dated Aug. 24, 2022, issued in Korean Patent Application No. 10-2018-0119316.

* cited by examiner

METHOD AND APPARATUS FOR PROVIDING INFORMATION FOR VEHICLE COMMUNICATION SERVICES

CROSS-REFERENCE TO RELATED APPLICATION(S)

This application is based on and claims priority under 35 U.S.C. § 119(a) of a Korean patent application number 10-2018-0119316, filed on Oct. 5, 2018, in the Korean Intellectual Property Office, the disclosure of which is incorporated by reference herein in its entirety.

BACKGROUND

1. Field

The disclosure relates to methods and apparatuses for providing vehicle-to-everything (V2X) services in a 5th generation (5G) mobile communication system.

2. Description of Related Art

Efforts have been made to develop an improved 5th generation (5G) communication system or pre-5G communication system to keep up with growing wireless data traffic demands after commercialization of 4th generation (4G) communication systems. For this reason, the 5G or pre-5G communication system is called a beyond 4G network communication system or post long-term evolution (LTE) system.

Implementation of 5G communication systems in an ultra-high frequency (millimeter wave (mmW)) band, such as a 60-GHz band, is under consideration to achieve high data rates. To mitigate path loss and increase transmission distance during radio wave propagation in an ultra-high frequency band for 5G communication systems, various technologies such as beamforming, massive multiple-input multiple-output (MIMO), full dimensional MIMO (FD-MIMO), array antennas, analog beamforming, and large-scale antennas are being studied.

Furthermore, to improve system networks for 5G communication systems, various technologies including evolved small cells, advanced small cells, cloud radio access network (Cloud-RAN), ultra-dense networks, device to device (D2D) communication, wireless backhaul, moving networks, cooperative communication, coordinated multi-points (CoMP), and interference cancellation are currently being developed. Furthermore, for 5G systems, advanced coding modulation (ACM) schemes such as Hybrid Frequency-Shift Keying (FSK) and Quadrature Amplitude Modulation (QAM) Modulation (FQAM) and Sliding Window Superposition Coding (SWSC) and advanced access techniques such as Filter Bank Multicarrier (FBMC), non-orthogonal multiple access (NOMA), sparse code multiple access (SDMA), etc. are being developed.

In a 5G system, compared to an existing 4G system, support for various services is considered. For example, the most representative services of the 5G system may include an enhanced mobile broadband (eMBB) service, an ultra-reliable and low latency communication (URLLC) service, a massive machine type communication (mMTC) service, a next-generation broadcasting service such as evolved multimedia broadcast/multicast service (eMBMS), etc. A system for providing the URLLC service and a system for providing the eMBB service may be respectively referred to as a URLLC system and an eMBB system. The terms "service" and "system" may be used interchangeably.

The URLLC service is considered to be newly used in the 5G system, unlike in the existing 4G system, and needs to fulfill ultra-high reliability (with a packet error rate of about $10^{-5}$) and low latency (e.g., about 0.5 msec) requirements, compared to other services. To meet these strict requirements, the URLLC service may require application of a transmission time interval (TTI) shorter than that of the eMBB service, and various operation methods using the URLLC service are being considered.

The Internet has evolved from a human-centered connection network, in which humans create and consume information, to the Internet of things (IoT) network in which dispersed components such as objects exchange information with one another to process the information. The Internet of Everything (TOE) technology has emerged, in which the IoT technology is combined with, for example, technology for processing big data through connection with a cloud server. To implement the IoT, technologies such as a sensing technique, a wired/wireless communication and network infrastructure, a service interface technology, and a security technology are required. Research has recently been conducted into technologies such as sensor networks for interconnecting objects, machine to machine (M2M) communication, and machine type communication (MTC). In the IoT environment, intelligent Internet technology services may be provided to create new values for a human life by collecting and analyzing data obtained from interconnected objects. The IoT can be applied to various fields such as smart home, smart building, smart city, smart car or connected car, smart grid, health care, smart home appliance, advanced medical service through convergence and integration between existing information technology (IT) and various industries.

Various attempts are being made to apply a 5G communication system to the IoT network. For example, sensor networks, M2M communication, and MTC technologies are implemented using 5G communication technologies including beamforming, MIMO, and array antennas. The application of the above-described Cloud RAN as a big data processing technique is an example of convergence between the 5G and IoT technologies.

Because various services may be provided due to the aforementioned technical features and the development of mobile communication systems, there is a need for a method of effectively performing vehicle communication.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of effectively providing a vehicle-to-everything (V2X) service to a terminal in a V2X system.

Additional aspects will be set forth in part in the description which follows and, in part, will be apparent from the description, or may be learned by practice of the presented embodiments.

In accordance with an aspect of the disclosure, a method, performed by an access and mobility management function (AMF), of providing information for a vehicle-to-everything (V2X) service is provided. The method includes receiving, from a user equipment (UE), a registration request message including information indicating that the UE is a V2X terminal, selecting, based on the registration request message, a policy control function (PCF) supporting the V2X service, receiving V2X policy information from the selected PCF, and providing the V2X policy information to a base station.

The method may further include establishing a policy association with the selected PCF.

The method may further include determining, based on subscription information received from user data management (UDM), whether the UE is allowed to receive the V2X service, wherein the subscription information may include authorization information indicating whether the UE is authorized to use the V2X service.

The providing of the V2X policy information to the base station may include providing the V2X policy information to the base station by using a next-generation application protocol (NGAP).

The selecting of the PCF may include transmitting a message requesting a network repository function (NRF) to discover a PCF supporting the V2X service, receiving information about the PCF from the NRF, and selecting the PCF discovered by the NRF, and the message requesting the discovery of the PCF may include an indication of support of the V2X service.

The method may further include receiving updated V2X policy information from the PCF, storing the updated V2X policy information as part of context information of the UE, and providing the updated V2X policy information to the base station.

The V2X policy information provided to the base station may include at least one of quality of service (QoS) parameter information or V2X authorization information, and the QoS parameter information may include at least one of identification information of the V2X service or a PC5 QoS parameter.

In accordance with another aspect of the disclosure, a method, performed by a PCF, of providing information for a V2X service is provided. The method includes generating V2X policy information, establishing policy association with an AMF, and providing the generated V2X policy information to the AMF.

The V2X policy information may include at least one of QoS parameter information or V2X authorization information, and the QoS parameter information may include at least one of identification information of the V2X service or a PC5 QoS parameter.

The method may further include updating the V2X policy information, and providing the updated V2X policy information to the AMF.

In accordance with another aspect of the disclosure, an AMF for providing information for a V2X service is provided. The AMF includes a transceiver and a processor combined with the transceiver and configured to receive, from a UE, a registration request message including information indicating that the UE is a V2X terminal, select, based on the registration request message, a PCF supporting the V2X service, receive V2X policy information from the selected PCF, and provide the V2X policy information to a base station.

The processor may be further configured to establish policy association with the selected PCF.

The processor may be further configured to determine, based on subscription information received from UDM, whether the UE is allowed to receive the V2X service, wherein the subscription information includes authorization information indicating whether the UE is authorized to use the V2X service.

The processor may be further configured to provide the V2X policy information to the base station by using a NGAP.

The processor may be further configured to transmit a message requesting a NRF to discover a PCF supporting the V2X service, receive information about the PCF from the NRF, and select the PCF discovered by the NRF, and the message requesting the discovery of the PCF may include an indication of support of the V2X service.

The processor may be further configured to receive updated V2X policy information from the PCF, store the updated V2X policy information as part of context information of the UE, and provide the updated V2X policy information to the base station.

The V2X policy information provided to the base station may include at least one of QoS parameter information or V2X authorization information, and the QoS parameter information may include at least one of identification information of the V2X service or a PC5 QoS parameter.

In accordance with another aspect of the disclosure, a PCF for providing information for a V2X service is provided. The PCF includes a transceiver and a processor electrically connected to the transceiver and configured to generate V2X policy information, establish policy association with an AMF, and provide the generated V2X policy information to the AMF.

The processor may be further configured to update the V2X policy information and provide the updated V2X policy information to the AMF.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

In the disclosure, a controller may also be referred to as a processor.

Throughout the specification, a layer (or a layer apparatus) may also be referred to as an entity.

Hereinafter, operation principles of the disclosure will be described in detail with reference to the accompanying drawings. In the following description of the disclosure, known functions or configurations are not described in detail because they would obscure the essence of the disclosure with unnecessary detail. Furthermore, the terms used herein are defined by taking functions described in the disclosure into account and may be changed according to a user's or operator's intent or custom. Therefore, definition of the terms should be made based on the overall description of the disclosure.

Similarly, in the accompanying drawings, some components are exaggerated, omitted, or schematically illustrated. Furthermore, the size of each element does not entirely reflect an actual size thereof. In the drawings, like reference numerals refer to the same or corresponding elements throughout.

The disclosure will be more readily appreciated by referring to the following description of embodiments of the disclosure and the accompanying drawings. However, the disclosure may be embodied in many different forms and should not be construed as being limited to the embodiments of the disclosure set forth herein. Rather, the embodiments of the disclosure are provided so that the disclosure will be thorough and complete and will fully convey the concept of the disclosure to those of ordinary skill in the art, and the disclosure will only be defined by the appended claims. Throughout the specification, like reference numerals refer to like elements.

It will be understood that each block of the flowchart in the drawings and combinations of blocks of the flowchart may be performed by computer program instructions. These computer program instructions may be loaded into a processor of a general-purpose computer, special-purpose computer, or other programmable data processing equipment, and thus, the instructions performed via the processor of the computer or other programmable data processing equipment create a means for performing functions specified in the flowchart block(s). The computer program instructions may also be stored in a computer-usable or computer-readable memory capable of directing a computer or another programmable data processing apparatus to implement functions in a specific manner, and thus, the instructions stored in the computer-usable or computer-readable memory may produce an article of manufacture including the instruction means for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. In addition, according to an embodiment of the disclosure, the "unit" may include one or more processors.

In the following descriptions of the disclosure, well-known functions or configurations are not described in detail because they would obscure the disclosure with unnecessary details. Embodiments of the disclosure will be described in detail below with reference to the accompanying drawings.

As used in the following description, terms identifying access nodes, terms indicating network entities, terms indicating messages, terms indicating interfaces between network entities, terms indicating various types of identification information, etc. are exemplified for convenience of explanation. Accordingly, the disclosure is not limited to terms to be described later, and other terms representing objects having the equivalent technical meaning may be used.

Hereinafter, for convenience of description, the disclosure uses terms and names defined in the $3^{rd}$ Generation Partnership Project Long Term Evolution (3GPP LTE) specifications. However, the disclosure is not limited to the terms and names but may also be identically applied to systems that comply with other standards. In the disclosure, evolved NodeB (eNB) may be used interchangeably with next-generation NodeB (gNB) for convenience. For example, a base station (BS) described as eNB may represent a gNB.

Hereinafter, a BS is an entity that allocates resources to a terminal, and may be at least one of a gNode B, an eNode B, a Node B, a BS, a wireless access unit, a BS controller, or a network node. A terminal may include a user equipment (UE), a mobile station (MS), a cellular phone, a smart phone, a computer, or a multimedia system capable of performing a communication function, but is not limited thereto.

In particular, the disclosure may be applied to the 3GPP New Radio (NR) (the 5th mobile communications standard). Furthermore, the disclosure may be applied to intelligent services (e.g., smart home, smart building, smart city, smart car or connected car, health care, digital education, retail business, security and safety related service, etc.) based on the 5G communication technology and the Internet of Things (IoT) related technology. In the disclosure, eNB may be used interchangeably with gNB for convenience. For example, a BS described as eNB may represent a gNB. Furthermore, the term 'terminal' may refer to a mobile phone, NB-IoT devices, sensors, and other wireless communication devices.

Although embodiments of the disclosure are hereinafter described with respect to an LTE, LTE-Advanced (LTE-A), LTE Pro, or 5G (or NR as next-generation mobile communication) system, the embodiments of the disclosure may be applied to other communication systems having similar technical backgrounds and channel configurations. Furthermore, it should be understood by those skilled in the art that the embodiments of the disclosure are applicable to other communication systems though modifications not departing from the scope of the disclosure.

Efforts have been made towards developing an improved 5G communication system (NR) to meet increasing demands for wireless data traffic after commercialization of $4^{th}$ Generation (4G) communication systems. To achieve high data rates, 5G communication systems have been designed to use a resource in an ultra-high frequency (millimeter wave (mmW)) band (such as a 28 GHz band). To mitigate path loss and increase transmission distance during radio wave propagation in the ultra-high frequency band for 5G communication systems, technologies including beamforming, massive multiple-input multiple-output (MIMO), full dimensional MIMO (FD-MIMO), array antennas, analog beamforming, and large-scale antennas are being studied. Furthermore, unlike LTE systems, 5G communication systems support various subcarrier spacings of 15 kHz, 30 kHz, 60 kHz, and 120 kHz, and a physical control channel and a physical data channel for a 5G communication system respectively utilize polar coding and low density parity check (LDPC). In addition, discrete Fourier transform spread orthogonal frequency-division multiplexing (DFT-S-OFDM) as well as cyclic prefix OFDM (CP-OFDM) is used as a waveform for uplink transmission. LTE may support hybrid automatic repeat request (hybrid ARG or HARQ) retransmission based on a transport block (TB), while 5G may support code block group (CBG)-based HARQ retransmission in addition to the HARG retransmission based on the transport block.

Furthermore, to improve system networks for 5G communication systems, various technologies including evolved small cells, advanced small cells, cloud radio access network (Cloud-RAN), ultra-dense networks, device to device (D2D) communication, wireless backhaul, moving networks, cooperative communication, coordinated multi-points (CoMP), and interference cancellation are currently being developed.

As described above, a 5G communication system may provide a plurality of services to a user, and a method capable of providing each service within the same time period according to desired characteristics and an apparatus employing the method are required to provide the plurality of services to the user. Various services provided by the 5G communication system have been studied and one of the services is a service that meets low latency and high reliability requirements.

Vehicle-to-everything (V2X) is a general term referring to all types of communication schemes applicable to vehicles on the road, and enable various supplementary services in addition to initial safety-related use cases in line with advancement in wireless communication technologies.

A wireless access in vehicular environments (WAVE) standard based on Institute of Electrical and Electronics Engineers (IEEE) 802.11p and IEEE P1609 has been standardized as a technology for providing V2X services. However, a WAVE technology that is a type of dedicated short range communication (DSRC) technology has a limitation in terms of a message delivery distance between vehicles.

To overcome the limitation, discussions on a cellular based V2X standard are ongoing at 3GPP. A LTE-based 4G V2X standard is completed in Release 14, and discussions on a 5G V2X standard based on NR (hereinafter, referred to as "NR" or "5G") are ongoing in Release 16.

According to an embodiment of the disclosure, in a 3GPP-based V2X system, a BS needs to know authorization information (or authentication information) indicating whether a terminal is authorized to use a V2X service. When the terminal requests V2X communication requiring a network assistance, the BS may determine whether to provide radio resources to the terminal based on the authorization information. Furthermore, in the 3GPP-based V2X system, quality-of-service (QoS) information needed for the terminal to use the V2X service needs to be transmitted to the BS. The BS may compare, based on the received QoS information, QoS required by the terminal with QoS set by the network to determine an appropriate QoS value and then provide radio resources to the terminal.

According to an embodiment of the disclosure, in the 3GPP-based V2X system, the terminal needs to be aware of the QoS information that is usable when using the V2X service. The terminal may transmit data by setting, based on the QoS information, one of QoS values that is available according to the type of data requested by a V2X application.

According to an embodiment of the disclosure, an access and mobility management function (AMF) may receive policy information for V2X communication from a network entity for providing a policy for V2X communication (i.e., authorization information and QoS information). The AMF may also determine at least one parameter value for a vehicle communication service based on a message related to the policy information.

According to an embodiment of the disclosure, the BS may receive via the AMF the message related to the policy information from a network entity for providing the policy for V2X communication. The BS may determine at least one parameter value for a vehicle communication service based on a policy-related message.

According to an embodiment of the disclosure, the terminal may receive policy information for a terminal related to a vehicle communication service. The terminal may use or perform the vehicle communication service based on the at least one parameter value.

According to an embodiment of the disclosure, when a policy for a vehicle communication service is changed, the BS or terminal may receive an update about policy information from a network entity providing the policy for the vehicle communication service.

Technical problems to be solved in the disclosure are not limited to above-described technical problems. And, other technical problems that are not described herein can be clearly understood from the following description by those of ordinary skill in the art.

Figure 1:
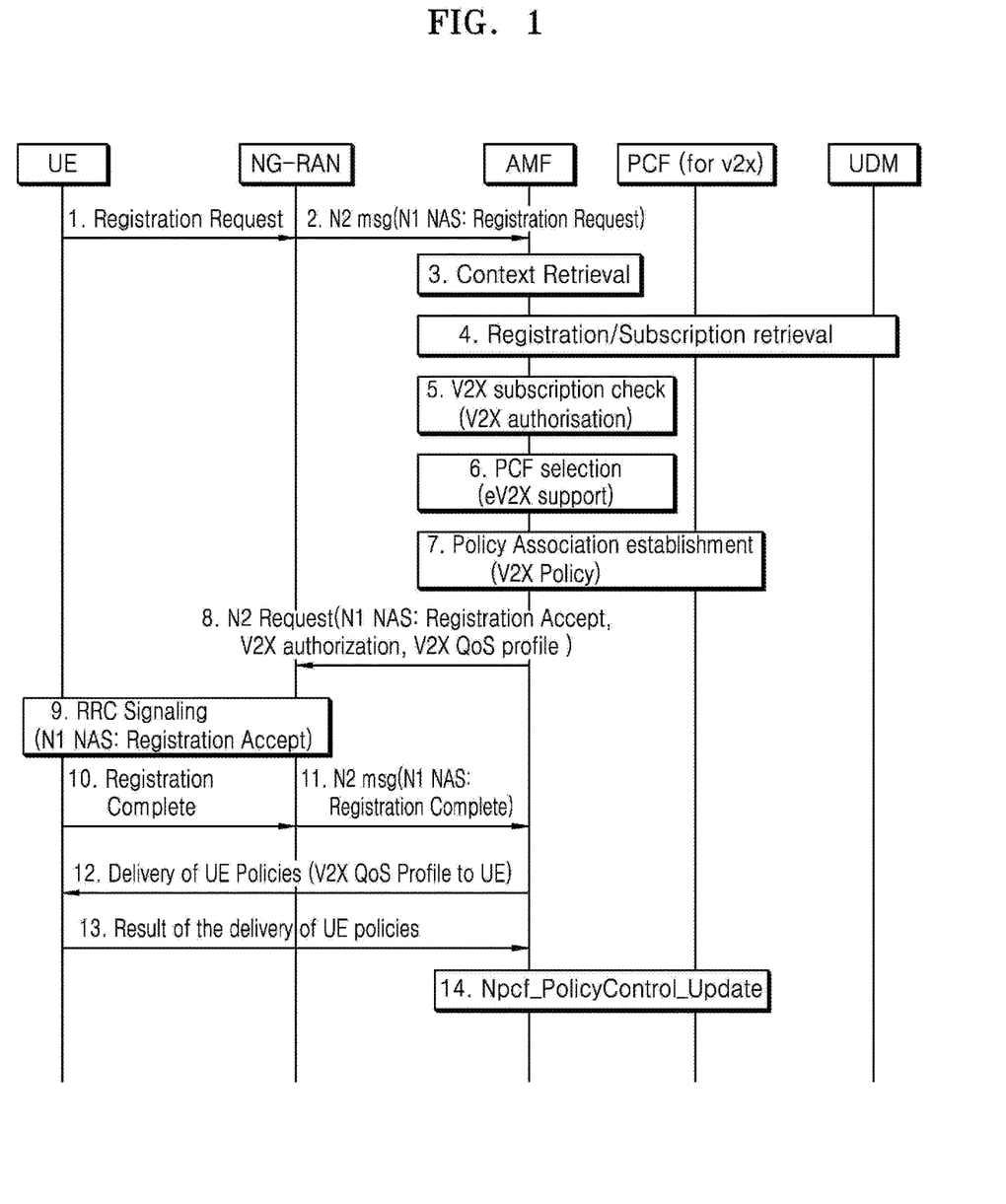
FIG. 1 illustrates a method, performed by an access and mobility management function (AMF), of obtaining a policy for a vehicle-to-everything (V2X) service including authorization information and quality-of-service (QoS) information and transmitting the obtained policy to a base station (BS) and a user equipment (UE) when the UE performs registration with a 5th generation (5G) system, according to an embodiment of the disclosure.

FIG. 1 illustrates a method, performed by an AMF, of obtaining a policy for a V2X service including authorization information and QoS information and transmitting the obtained policy to a BS and a UE when the UE performs registration with a 5G system, according to an embodiment of the disclosure.

Entities specified in the disclosure will now be described with reference to FIGS. 1 and 2.

Referring to FIG. 1, a UE (or terminal) is connected to a NG-RAN to access a device that performs a mobility management function of a 5G core network device. In the disclosure, the device will be referred to as an AMF. The AMF may refer to a function, an entity, or a device that is in charge of both access to the RAN and mobility management of the UE.

A Policy Control Function or Policy & Charging Function (PCF) may control policy and charging related information for a session, which is used by the UE. A Network Repository Function (NRF) stores information about network functions (NFs) installed in a mobile operator's network and provides the information about NFs installed therein. The NRF may be connected to all NFs, and when each NF starts running on an operator's network, the NF performs registration with the NRF such that the NRF discovers that the NF is running on the operator's network.

A V2X Control Function (V2X CF) manages and controls a policy and authentication/authorization information for a V2X service. The V2X CF has overall control information for a V2X service used by a network or UE and may serve to provide the overall control information to each entity in the network. V2X service parameters may include authentication information or authorization information, radio parameter information necessary for receiving a V2X service when a UE is located out of network coverage, and policy parameter information necessary for providing a V2X service. However, the V2X service parameters are not limited thereto.

According to an embodiment of the disclosure, a V2X application server (AS) may provide the policy and authentication/authorization information to the V2X CF. Furthermore, the V2X CF may directly generate policy and authentication/authorization information and acquire the same from NFs.

The authentication/authorization information managed by the V2X AS may include information about whether the UE is a terminal that is able to use a service provided by the V2X AS, information indicating which service is to be used among the services provided by the V2X AS when the UE is able to use a service provided by the V2X AS, information about whether the UE is able to use a V2X service based on D2D communication, information about whether the UE is able to use a V2X service based on multicast/broadcast communication (such as multimedia broadcast/multicast service (MBMS)), information about whether the UE is able to use the V2X service based on the D2D communication in areas outside network coverage, a list of mobile operators (such as public land mobile network (PLMN), etc. However, the authentication/authorization information is not limited thereto.

According to an embodiment of the disclosure, the information indicating which service is to be used among the services provided by the V2X AS may include whether the UE is able to use a vehicle-to-pedestrian (V2P) service, whether the UE is able to use a vehicle-to-infrastructure (V2I) service, and whether the UE is able to use all V2X services provided by the V2X AS. Furthermore, the information indicating which service is to be used among the services provided by the V2X AS may include identifier (ID) information of a service that is accessible from the UE based on a service ID (e.g., provider service ID (PSID) or intelligent transport system (ITS); application object ID (ITS-AID)) mapped to each V2X service. However, such information is not limited thereto.

According to an embodiment of the disclosure, radio parameter information necessary for receiving a V2X service when a UE managed by the V2X AS is located outside network coverage may include radio frequency information and information about an area that a radio frequency is available to be used. When the UE is located outside network coverage, the UE may receive a V2X service by using prestored radio parameter information. However, embodiments of the disclosure are not limited thereto.

According to an embodiment of the disclosure, policy parameter information necessary for providing a V2X service managed by the V2X AS may be a service ID (e.g., PSID or ITS-AID) indicating a V2X service and its corresponding destination layer-2 ID, packet priority information (e.g., ProSe Per-Packet Priority (PPPP), etc.) and a corresponding packet delay budget information, a list of V2X services requiring privacy, a V2X service type (e.g., vehicle-to-vehicle (V2V), V2P, V2I, or vehicle-to-nomadic (V2N)), or an ID of a V2X service (e.g., PSID or ITS-AID) and information about a V2X frequency that can be supported by the V2X service. However, the policy parameter information is not limited thereto.

User Data Management, or Unified Data Management (UDM) performs the same function as a home subscriber server (HSS) in a 4G network. The UDM may store subscription information of a UE or a context used by the UE within a network. The UDM, PCF, AMF, and NRF are interconnected via a service based interface, and UDM, PCF, AMF, and NRF exchange control messages with one another such that a service (or application programming interface (API) provided by each NF is used by other NFs. NFs define their supportable services which are respectively indicated by Nudm, Npcf, Namf, Nnrf, etc. in the standard.

For convenience, the disclosure uses terms and names defined in the 3GPP specification document. However, the disclosure is not limited to the terms and names but may also be identically applied to systems that comply with other specifications.

Although the embodiments of the disclosure are mainly described with respect to communication specifications defined in the 3GPP, it will be understood by those skilled in the art that a main feature of the disclosure may be applied to other communication systems having similar technical backgrounds through a slight modification without greatly departing the scope of the disclosure.

Embodiment 1

FIG. 1 illustrates a method, performed by an AMF, of obtaining a policy for a V2X service including authorization information and QoS information and transmitting the obtained policy to a BS and a UE when the UE performs registration with a 5G system, according to an embodiment of the disclosure.

FIG. 1 illustrates a method of transmitting, when a UE capable of using a V2X service performs registration with a 5G system, information for the V2X service of the UE received from a PCF to a BS and the UE.

Operation 1: The UE performs a registration procedure to access the 5G system. After establishing a radio resource control (RRC) connection with the BS, the UE transmits an RRC message including a registration request message that is a non-access stratum (NAS) message to be sent to an AMF. The UE may transmit the registration request message that includes identification information indicating that the UE itself is a V2X UE. Alternatively, the UE may transmit the registration request message that includes identification information indicating its use of a network slice capable of supporting a V2X service. The identification information indicating use of a network slice may follow the format of network slice selection assistance information (NSSAI).

Operation 2: The BS selects an AMF based on an ID of the UE, a current location of the UE, or identification information of a network slice to be used by the UE. The BS delivers to the selected AMF the registration request message that is an NAS message sent by the UE in operation 1.

Operation 3: The AMF may infer an AMF that previously served the UE based on the ID of the UE included in the registration request message sent by the UE. The AMF may determine that there is an AMF previously serving the UE and request a context of the UE from the serving AMF. After receiving the context of the UE, the AMF stores the received context for use in management of the UE. The AMF determines that the UE initially accesses the 5G system and creates a context for managing the UE.

Operation 4: The AMF performs a registration procedure to register its management of the UE with UDM. Furthermore, the AMF transmits a request for subscription data of the UE to the UDM and receives the subscription data of the UE from the UDM. Data related to access and mobility of the UE may be included in the subscription data. For example, the subscription data may include information about a service or network slice available from the UE, information about whether the UE is able to use a V2X service, information indicating that the UE is a V2X UE, information about an area where the UE is able to use a V2X service, etc. Furthermore, the subscription data of the UE may include authentication/authorization information indicating whether the UE is authorized to use a V2X service or information (e.g., NSSAI) about a network slice for V2X that is usable by the UE, and authorization information about communication modes (e.g., PC5 multicast, PC5 unicast, etc.) available when the UE performs direct communication for a V2X service.

Operation 5: The AMF may check authentication/authorization information indicating whether the UE is authorized to use a V2X service in the subscription data of the UE received from the UDM and determine to allow the UE to use the V2X service. When the registration request message sent by the UE in operation 1 includes an ID indicating a UE's request to use a V2X service or information about a network slice for the V2X service, the AMF may compare the ID or information with the subscription data received in operation 4 to determine whether to provide the V2X service or network slice to the UE.

Operation 6: The AMF may select a PCF to receive a policy for providing a 5G service to the UE. When the AMF has not yet obtained the policy for the UE or when the policy is no longer valid in the context of the UE held by the AMF, the AMF may select a PCF and then perform a policy association establishment procedure with the selected PCF. The AMF performs the policy association establishment procedure with the PCF and acquires related policy information.

According to an embodiment of the disclosure, when the acquired policy information does not include V2X-related policy information, the AMF may determine that a separate PCF for V2X is to be selected.

Even without the above-described determination procedure, according to an embodiment of the disclosure, because the AMF has determined that the UE is allowed to access the V2X service in operation 5, the AMF may select a PCF supporting the V2X service in order to obtain a policy for the V2X service to be used by the UE. The AMF may perform the following operations in order to select a PCF supporting the V2X service, i.e., a PCF capable of delivering a V2X policy. First, the subscription data of the UE acquired from the UDM in Operation 4 may include address information of a PCF for V2X. The AMF may select the PCF based on the address information. Second, address information of a PCF for V2X supporting a V2X service may be preset in the AMF. This may be information preset with respect to a network slice for V2X. Thus, the AMF may acquire an address of a PCF based on the preset information about which PCF is to be selected for a network slice for V2X to be used by the UE. Third, the AMF may transmit, based on information about a network slice for V2X, a request for discovery of a proper PCF supporting the network slice to NRF. The AMF may transmit a request message for discovery of a proper PCF to the NRF by including NSSAI for V2X in the request message. After receiving the request from the AMF, the NRF returns to the AMF address information of a PCF for a network slice identified by the NSSAI, and the AMF selects the PCF. Fourth, the AMF may transmit a request for discovery of a PCF supporting V2X to the NRF. The AMF may transmit a request message for discovery of a proper PCF to the NRF by including an indication of support of V2X in the request message. After receiving the request from the AMF, the NRF returns to the AMF address information of a PCF supporting V2X, and the AMF selects the PCF.

In addition to the operation of selecting the PCF for V2X and establishing policy association with the selected PCF, the AMF may also perform a procedure for obtaining an access and mobility policy for the UE with another PCF. When a policy is no longer valid in the context of the UE held by the AMF, the AMF may select a PCF and then perform a policy association establishment procedure with the selected PCF. The PCF may be the same as or different from the PCF for V2X selected in operation 6. When the PCF for V2X is the same as the PCF for obtaining an access and mobility policy, the AMF may perform a policy association establishment procedure with the PCF to obtain both V2X policy and access and mobility related policy for the UE.

When the PCF for V2X is different from the PCF for obtaining an access and mobility policy, the AMF may respectively perform policy association establishment procedures with the two PCFs and obtain related policies from the PCFs. The AMF may determine that the PCF for V2X is different from the PCF for obtaining an access and mobility policy as follows. To obtain a policy, the AMF selects a PCF to perform a policy association establishment procedure with the PCF. When information about the obtained policy includes only information about a V2X policy, the AMF may determine that the AMF needs to negotiate with another PCF for obtaining an access and mobility policy. Similarly, when the information about the obtained policy includes only information about an access and mobility policy, the AMF may determine that the AMF needs to negotiate with another PCF for obtaining a V2X policy.

Operation 7: After selecting the PCF for V2X in operation 6, the AMF performs a policy association establishment procedure with the selected PCF. The AMF may transmit to the PCF a request including an ID of the UE, identification information of a network slice for V2X requested by the UE, or identification information of a V2X service to be used by the UE. After receiving the request from the AMF, the PCF may configure V2X policy information for the terminal, the network slice, or the V2X service. The V2X policy information may include, but is not limited to, the following information:

<V2X QoS Profile>
PC5-Aggregated Maximum Bitrate (AMBR) used in PC5 Unicast
5G QoS Identifier (5QI) authorized for use by the UE in PC5 Unicast
V2X service ID that is available in PC5 Unicast and QoS information mapped to the V2X service ID, such as a 5QI or maximum bitrate
PC5-AMBR used in PC5 Multicast
<V2X Authorization>
V2V Authorization
V2P Authorization
V2N Authorization
V2X Unicast Authorization
V2X Multicast Authorization Some of the information may be included in the V2X policy information before being delivered to the AMF. The above-described information may be set for each UE, each network slice for V2X to be used by the UE, or each V2X service used by the UE. The V2X policy information may be information provided by the PCF from a V2X AS or V2X CF. The V2X AS for providing a $3^{rd}$ party V2X service may configure policy information necessary for the UE to use its service and provide the policy information to the PCF. Furthermore, an NF, called a V2X CF, may exist in a mobile communication network to perform the overall control operations for a V2X service. The V2X CF may have stored policy information for the UE using the V2X service and provide the stored policy information to the PCF in advance.

For the V2X service, the PC5 unicast may receive scheduling of radio resources from a BS and may transmit data. Thus, QoS information that is usable by the UE in the PC5 unicast may be transmitted to the BS. Furthermore, authorization information indicating whether the UE is able to use PC5 unicast or whether the UE is authorized to use a V2V or V2P service over PC5 may be transmitted to the BS. The authorization information is used to check whether a service requested by the UE or PC5 unicast is usable when the UE requests radio resources from the BS to use a V2V service, V2P service, or PC5 unicast.

The UE using the V2X service may check QoS information that is available in the PC5 unicast. The UE may request a radio resource from the BS to use the PC5 unicast. In this case, the UE may notify the BS of 5QI information that the UE attempts to use in the PC5 unicast and thus may be guaranteed with respect to QoS matching the 5QI. Thus, the QoS information that is usable by the UE in the PC5 unicast may be transmitted to the UE. A V2X service ID that is available in the PC5 unicast and QoS information mapped to the V2X service ID, such as 5QI or maximum bitrate, may also be transmitted to the UE. The UE may check data requested by a V2X application and a V2X service ID corresponding to the data and thus may determine which QoS to use for transmission of the data.

The V2X policy information transmitted by the PCF to the AMF in operation 7 may be configured by respectively separating a policy delivered to the UE and a policy delivered to the BS into corresponding containers. Alternatively, the AMF may configure a container by respectively determining which information to deliver to the BS and which information to deliver to the UE based on the received V2X policy. As described above, the V2X policy may consist of V2X Authorization and a V2X QoS Profile but may also be configured as a list of detailed information. Although configurations may vary, when at least one in the list of detailed information is included therein, the policy may be referred to as a V2X policy described in the disclosure.

Operation 8: The AMF configures V2X policy information to include a V2X policy to be delivered to the BS and a V2X policy to be delivered to the UE according to operation 7. Each V2X policy may also be configured separately to include policy information required for the BS or information required for the UE.

The AMF includes in an N2 message to be transmitted to the BS a registration accept message that is a response NAS message to the NAS message sent by the UE in operation 1. The AMF may include a V2X policy for the UE configured in operation 7 in the response NAS message. Furthermore, the AMF transmits to the BS the N2 message including a V2X policy for the BS that is necessary for the BS to manage the UE using the V2X service. The V2X policy includes authorization information about a PC5 transmission mode (multicast or unicast) or V2X service, which is available in the UE, or QoS information about the PC5 transmission mode or V2X service.

After receiving the N2 message from the AMF, the BS may determine that a NAS message is to be transmitted to the UE. The BS stores the received V2X policy in a UE context. The BS uses the V2X policy information when the UE requests radio resources to be used on PC5 from the BS. Furthermore, the BS may include and transmit the V2X policy stored in the UE context when the UE context is forwarded between BSs. Thus, even when the UE moves to another BS (such as handover), the other BS may provide, to the UE, a V2X service by using the V2X policy stored in the UE context.

Operation 9: The BS transmits the NAS message received in operation 8 to the UE by using RRC signaling.

Operation 10: The UE may determine that the UE has been connected to a 5G network based on the received NAS message that is a registration accept message. Furthermore, when the NAS message received in operation 9 includes a V2X policy, the UE stores the V2X policy in its context. The UE constructs a NAS message 'Registration Complete' and transmits the NAS message to the AMF via the BS to notify the AMF of completion of the registration.

Operation 11: The BS delivers, via the N2 message, the NAS message received from the UE to the AMF.

Operation 12: When the NAS message does not include the V2X policy configured to be transmitted by the AMF to the UE in operation 8, the AMF may perform a separate NAS procedure to deliver the V2X policy to the UE. The NAS procedure in operation 12 is used to deliver policy information to the UE. The AMF transmits a NAS message to the UE. In this case, the NAS message includes V2X policy information configured by the AMF to be transmitted to the UE. The BS delivers the NAS message received from the AMF to the UE. After receiving the NAS message from the BS, the UE stores the V2X policy in the UE's context. The UE uses V2X policy information when using the V2X service.

Operation 13: The UE constructs a response NAS message indicating that the policies (e.g., the V2X policy) have been received and transmits the NAS message to the AMF. The response NAS message is transmitted to the AMF via the BS.

Operation 14: The AMF may transmit to the PCF a response indicating that the policies have been successfully delivered to the BS and the UE. Although FIG. 1 shows that the AMF uses a service operation called Npcf PolicyControl Update to transmit the response to the PCF, it is also obvious that the service operation for transmitting a response indicating successful delivery of the policies may be referred to by other names. When the V2X policy in operation 8 is delivered to the UE together with the registration accept message, the AMF may perform operation 14 after checking that registration by the UE is completed in operation 11.

Embodiment 2

Figure 2:
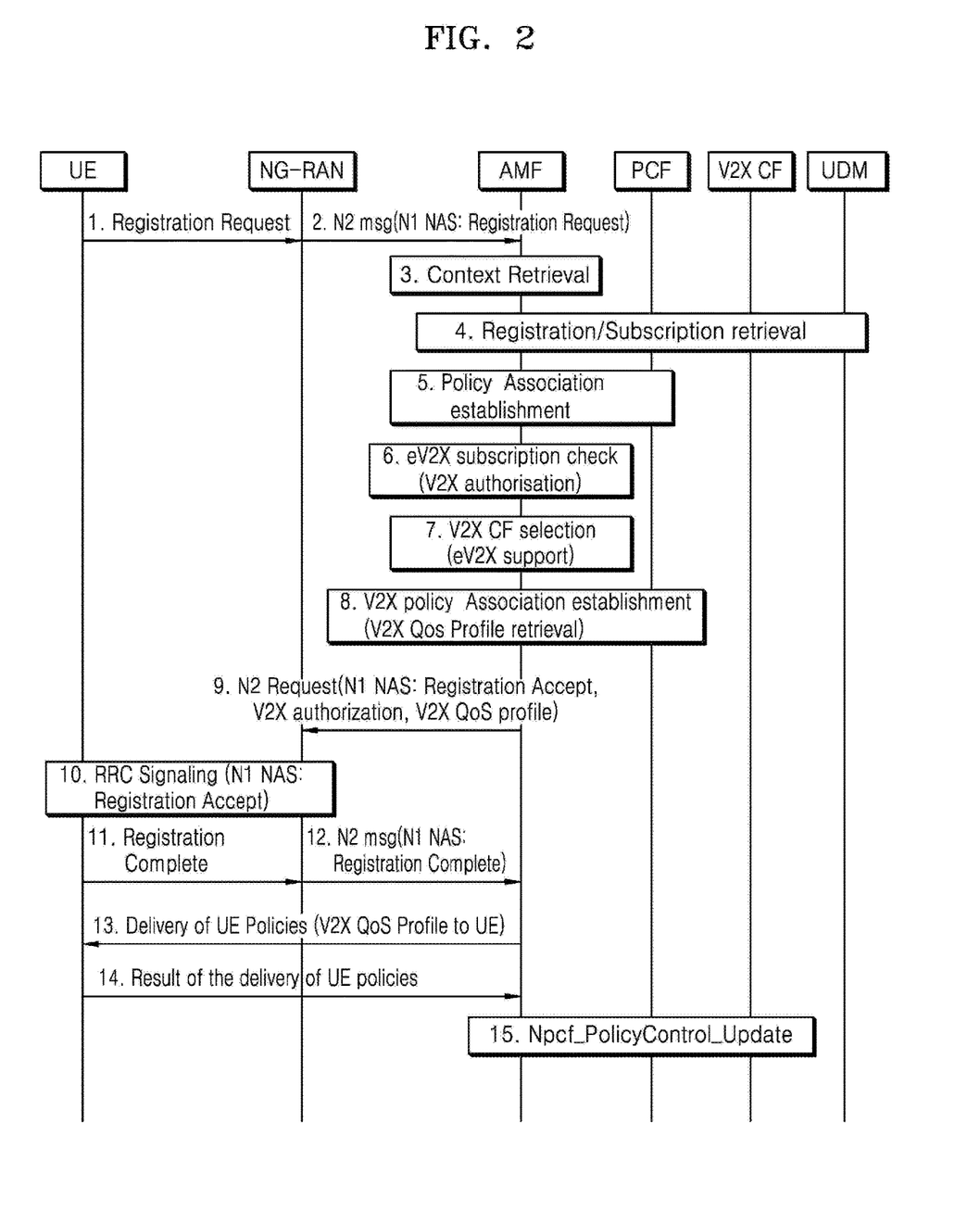
FIG. 2 illustrates a process whereby a terminal obtains a V2X service parameter from a network, according to an embodiment of the disclosure.

FIG. 2 illustrates a process whereby a UE obtains a V2X service parameter from a network, according to an embodiment of the disclosure.

Referring to FIG. 2, a method is illustrated of transmitting, when a UE capable of using a V2X service performs registration with a 5G system, information for the V2X service of the UE received from a PCF to a BS and the UE.

Operation 1: The UE performs a registration procedure to access the 5G system. After establishing an RRC connection with the BS, the UE transmits an RRC message including a registration request message that is the NAS message to be sent to an AMF. The UE may transmit the registration request message that includes identification information indicating that the UE itself is a V2X UE. Alternatively, the UE may transmit the registration request message that carries identification information indicating its use of a network slice capable of supporting a V2X service. The identification information indicating use of a network slice may follow the format of NSSAI.

Operation 2: The BS selects an AMF based on an ID of the UE, a current location of the UE, or identification information of a network slice to be used by the UE. Then, the BS delivers to the selected AMF the registration request message that is the NAS message sent by the UE in operation 1.

Operation 3: The AMF may infer an AMF that previously served the UE based on the ID of the UE included in the registration request message sent by the UE. The AMF may determine that there is an AMF previously serving the UE and request a context of the UE from the serving AMF. After receiving the context of the UE from the serving AMF, the AMF stores the received context for use in management of the UE. The AMF determines that the UE initially accesses the 5G system and creates a context for managing the UE.

Operation 4: The AMF performs a registration procedure to register its management of the UE with UDM. Furthermore, the AMF transmits a request for subscription data of the UE to the UDM and receives the subscription data of the UE from the UDM. Data related to access and mobility of the UE may be included in the subscription data. For example, the subscription data may include information about a service or network slice available in the UE, information about whether the UE is able to use a V2X service, information indicating that the UE is a V2X UE, information about an area where the UE is able to use a V2X service, etc. Furthermore, the subscription data of the UE may include authentication/authorization information indicating whether the UE is authorized to use a V2X service or information (e.g., NSSAI) about a network slice for V2X that is usable by the UE, and authorization information about communication modes (e.g., PC5 multicast, PC5 unicast, etc.) available when the UE performs direct communication for a V2X service.

Operation 5: The AMF may select a PCF to receive a policy for providing a 5G service to the UE. When the AMF has not yet obtained the policy for the UE or when the policy is no longer valid in a context of the UE held by the AMF, the AMF may select a PCF and then perform a policy association establishment procedure with the selected PCF. The AMF performs the policy association establishment procedure with the PCF and acquires related policy information.

Operation 6: The AMF may check, from the subscription data of the UE received from the UDM, authentication/authorization information indicating whether the UE is authorized to use a V2X service and may determine to allow the UE to access the V2X service. When the registration request message sent by the UE in operation 1 includes an ID indicating a UE's request to use a V2X service or information about a network slice for the V2X service, the AMF may compare the ID or information with the subscription data received in operation 4 to determine whether to provide the V2X service or network slice to the UE.

Operation 7: The AMF needs to select a V2X CF to receive a policy for providing a 5G service to the UE. When the AMF has not yet obtained a V2X policy for the UE or when the V2X policy is no longer valid in the context of the UE held by the AMF, the AMF may select a V2X CF and then perform a policy association establishment procedure with the selected V2X CF. After establishing policy association with the V2X CF, the AMF may acquire V2X policy information from the V2X CF. Alternatively, the V2X CF may provide an update on new V2X policy information to the AMF, and the AMF may apply it to management of the UE.

The AMF may perform the following operations in order to select a V2X CF supporting the V2X service, i.e., capable of delivering a V2X policy. First, the subscription data of the UE acquired from the UDM in Operation 4 may include address information of a V2X CF. The AMF may select the V2X CF based on the address information. Second, address information of a V2X CF for V2X service may be preset in the AMF. This may be information preset with respect to a network slice for V2X. Thus, the AMF may acquire an address of a V2X CF based on the preset information about which V2X CF is to be selected for a network slice for V2X to be used by the UE. Third, the AMF may transmit, based on information about a network slice for V2X, a request for discovery of a proper V2X CF supporting the network slice to NRF. The AMF may transmit a request message for discovery of a proper V2X CF to the NRF by including NSSAI for V2X in the request message. After receiving the request from the AMF, the NRF returns to the AMF address information of a V2X CF for a network slice identified by the NSSAI, and the AMF selects the V2X CF. Fourth, the AMF may transmit a request for discovery of a V2X CF supporting V2X to the NRF. The AMF may transmit a request message for discovery of a proper V2X CF to the NRF by including an indication of support of V2X in the request message. After receiving the request from the AMF, the NRF returns to the AMF address information of a V2X CF supporting V2X, and the AMF selects the V2X CF.

Operation 8: After selecting the V2X CF for V2X in operation 7, the AMF performs a policy association establishment procedure with the selected V2X CF. The AMF may transmit to the V2X CF a request including an ID of the UE, identification information of a network slice for V2X requested by the UE, or identification information of a V2X service to be used by the UE. After receiving the request from the AMF, the V2X CF may configure V2X policy information for the UE, the network slice, or the V2X service. The V2X policy information may include, but is not limited to, the following information:

<V2X QoS Profile>

PC5-Aggregated Maximum Bitrate (AMBR) used in PC5 Unicast

5G QoS Identifier (5QI) authorized for use by the UE in PC5 Unicast

V2X service ID that is available in PC5 Unicast and QoS information mapped to the V2X service ID, such as a 5QI or maximum bitrate PC5-AMBR used in PC5 Multicast <V2X Authorization>

V2V Authorization

V2P Authorization

V2N Authorization

V2X Unicast Authorization

V2X Multicast Authorization

Some of the above-described information may be included in the V2X policy information before being delivered to the AMF. The above-described information may be set for each UE, each network slice for V2X to be used by the UE, or each V2X service used by the UE. The V2X policy information may be information provided by the V2X CF from a V2X AS. The V2X AS for providing a $3^{rd}$ party V2X service may configure policy information necessary for the UE to use its service and provide the policy information to the V2X CF.

For the V2X service, the PC5 unicast may receive scheduling of radio resources from a BS and may transmit data. Thus, QoS information that is usable by the UE in the PC5 unicast may be delivered to the BS. Furthermore, authorization information indicating whether the UE is allowed to use PC5 unicast or whether the UE is authorized to use a V2V or V2P service over PC5 may be transmitted to the BS. The authorization information is used to check whether a service requested by the UE or PC5 unicast is usable when the UE requests radio resources from the BS to use a V2V service, V2P service, or PC5 unicast.

The UE using the V2X service may check QoS information that is available in the PC5 unicast. The UE may request a radio resource from the BS to use the PC5 unicast. In this case, the UE may notify the BS of 5QI information that the UE attempts to use in the PC5 unicast and thus may be guaranteed with respect to QoS matching the 5QI. Thus, the QoS information that is usable by the UE in the PC5 unicast may be transmitted to the UE. A V2X service ID that is available in the PC5 unicast and QoS information mapped to the V2X service ID, such as 5QI or maximum bitrate, may also be transmitted to the UE. The UE may check data requested by a V2X application and a V2X service ID corresponding to the data and determine which QoS to use for transmission of the data based on the data and the V2X service ID.

The V2X policy information transmitted by the V2X CF to the AMF in operation 8 may be configured by respectively separating a policy delivered to the UE and a policy delivered to the BS into corresponding containers. Alternatively, the AMF may configure containers by respectively determining which information to deliver to the BS and which information to deliver to the UE based on the received V2X policy. As described above, the V2X policy may consist of V2X Authorization and a V2X QoS Profile but may also be configured as a list of detailed information. When a policy may be configured in different ways than described above but includes at least one among the list of the detailed information, the policy may be referred to as a V2X policy described in the disclosure.

Operation 9: The AMF configures the V2X policy information to include a V2X policy to be delivered to the BS and a V2X policy to be delivered to the UE according to operation 8. Each V2X policy may also be configured separately to include policy information required for the BS or information required for the UE.

The AMF includes in an N2 message to be transmitted to the BS a registration accept message that is a response NAS message to the NAS message sent by the UE in operation 1. The AMF may include a V2X policy for the UE configured in operation 8 in the response NAS message. Furthermore, the AMF transmits to the BS the N2 message including a V2X policy for the BS that is necessary for the BS to manage the UE using the V2X service. The V2X policy for the BS includes authorization information about a PC5 transmission mode (multicast or unicast) or V2X service, which is available from the UE, or QoS information about the PC5 transmission mode or V2X service.

After receiving the N2 message from the AMF, the BS may determine that a NAS message is to be transmitted to the UE. The BS stores the received V2X policy in a UE context. The BS uses the V2X policy information when the UE requests radio resources to be used on PC5 from the BS. Furthermore, the BS may include the V2X policy stored in the UE context for delivery even during movement of the UE context between BSs. Thus, even when the UE moves to another BS, the V2X policy stored in the UE context may be used to provide a V2X service to the UE.

Operation 10: The BS delivers the NAS message received in operation 9 to the UE by using RRC signaling.

Operation 11: The UE may determine that it has been connected to a 5G network based on the received NAS message that is a registration accept message. Furthermore, when the NAS message received in operation 9 includes a V2X policy, the UE stores the V2X policy in its context. The UE constructs a NAS message 'Registration Complete' and transmits the NAS message to the AMF via the BS to inform the AMF about completion of the registration.

Operation 12: The BS delivers, via the N2 message, the NAS message received from the UE to the AMF.

Operation 13: When the NAS message does not include the V2X policy configured to be transmitted by the AMF to the UE in operation 9, the AMF may perform a separate NAS procedure to deliver the V2X policy to the UE. The NAS procedure in operation 13 is used to deliver policy information to the UE. The AMF transmits a NAS message to the UE. In this case, the NAS message includes V2X policy information configured by the AMF to be transmitted to the UE. The BS delivers the NAS message received from the AMF to the UE. After receiving the NAS message from the BS, the UE stores the V2X policy in its context. The UE uses V2X policy information when using the V2X service.

Operation 14: The UE constructs a response NAS message indicating that policies have been well received and transmits the NAS message to the AMF. The response NAS message is transmitted to the AMF via the BS.

Operation 15: The AMF may transmit to the V2X CF a response indicating that the policies have been successfully delivered to the BS and the UE. The operation 15 refers to a service operation for transmitting a response indicating successful delivery of the policies. When the V2X policy is delivered to the UE together with the registration accept message in operation 8, the AMF may perform operation 14 after checking that registration by the UE is completed in operation 12.

Embodiment 3

Figure 3:
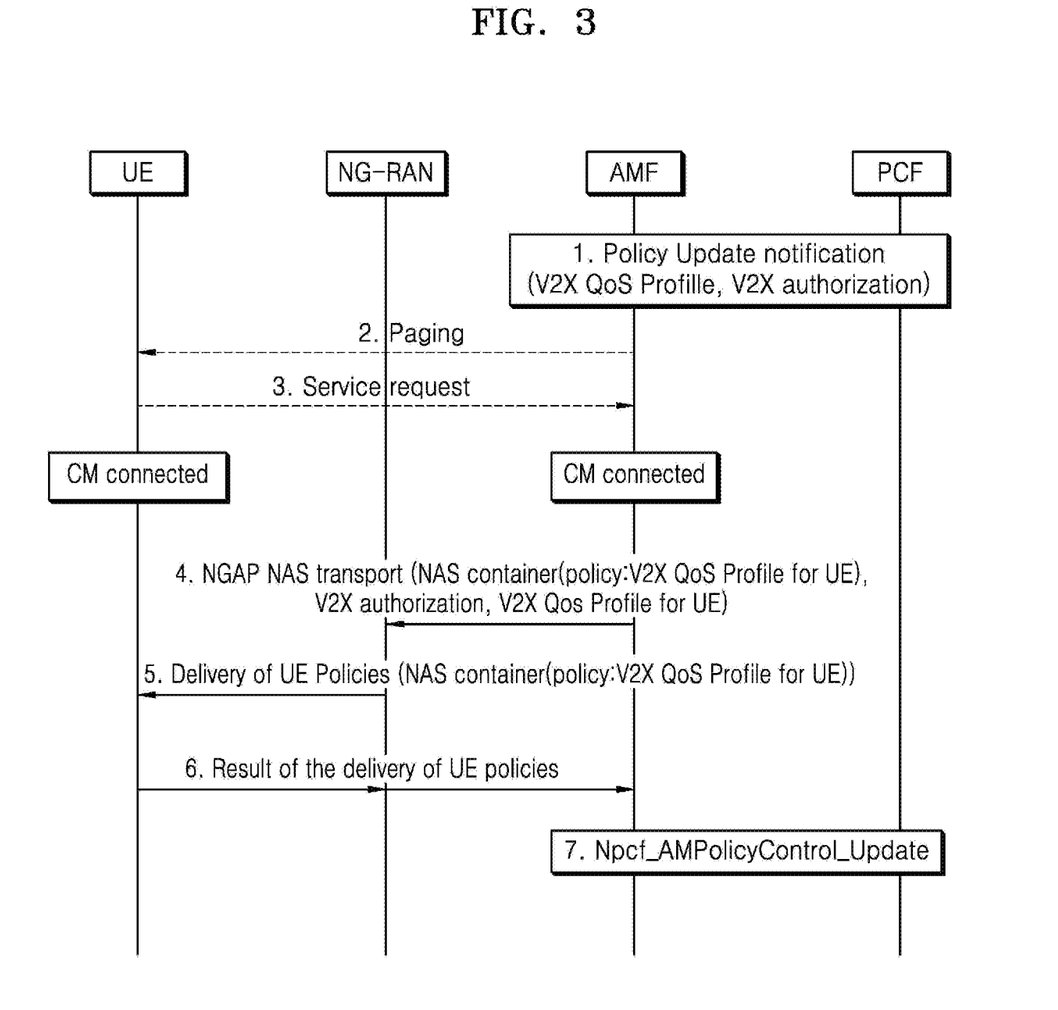
FIG. 3 illustrates a communication protocol stack supported by a terminal, according to an embodiment of the disclosure.

FIG. 3 illustrates a communication protocol stack supported by a UE, according to an embodiment of the disclosure. In other words, FIG. 3 illustrates a method of delivering, when a V2X policy is updated, the resulting V2X policy to a BS and the UE via an AMF.

Referring to FIG. 3, a PCF may be replaced with a V2X CF. Configurations and operations may vary depending on whether a V2X policy is provided by a PCF or V2X CF, but the embodiment 3 of the disclosure incorporates both the embodiments 1 and 2 of the disclosure.

Operation 1: A V2X policy may be updated in a PCF. The resulting V2X policy may be a new policy provided by the PCF from a $3^{rd}$ party V2X AS. A policy update may be required when a QoS Profile for a V2X service that is available from the UE is changed, i.e., at least one of when a 5QI for using the V2X service, which is mapped to a V2X service ID used by the UE, is changed, when the V2X service capable of using PC5 unicast is added/changed/deleted, or when a PC5-AMBR value applicable when using PC5 unicast is changed. Furthermore, the policy update may be required when policies on a V2X service used by the UE are changed such that the UE may not use a PC5 unicast, when the UE is authorized to use the PC5 unicast, or when whether the UE is authorized to use a V2V, V2P, or V2N service is changed However, embodiments of the disclosure are not limited thereto.

The PCF checks that a policy for a specific UE has been updated and transmits the resulting updated policy to an AMF responsible for managing the UE, i.e., an AMF that establish a policy association for the UE. The resulting updated policy may include a changed V2X QoS profile or changed V2X authorization.

The V2X policy transmitted by the PCF to the AMF in operation 1 may be configured by respectively separating a policy delivered to the UE and a policy delivered to the BS into corresponding containers. Alternatively, the AMF may configure a container by respectively determining which information to deliver to the BS and which information to deliver to the UE based on the received V2X policy. As in the above examples, the V2X policy may consist of V2X authorization and a V2X QoS profile but may also be configured as a list of detailed information. When a policy may be configured in different ways than described above but includes at least one among the list of the detailed information, the policy may be referred to as a V2X policy specified in the disclosure.

Operation 2: When the UE is not in a connected state, the AMF performs a paging procedure for waking up the UE.

Operation 3: After receiving a paging message from the AMF, the UE transits to a connected state while transmitting a service request message to the AMF. When the UE determines that a registration procedure is needed, the UE may transmit to the AMF a registration request message instead of the service request message after receiving the paging message.

When the UE transits to the connected state, the AMF determines that a signaling connection with the UE has been activated.

Operation 4: The AMF performs an operation of delivering the updated V2X policy received in operation 1 to the BS and the UE. The AMF configures V2X policy information to include a V2X policy to be delivered to the BS and a V2X policy to be delivered to the UE according to operation 1. Each V2X policy may also be configured separately to include policy information required for the BS or information required for the UE. The AMF delivers the V2X policy to the BS by using a NG application protocol (NGAP) used in an N2 interface with the BS. A NGAP message includes the V2X policy delivered to the BS. After receiving the NGAP message from the AMF, the BS may update and store a context of the UE according to information included in the V2X policy. The BS uses the V2X policy later when applying a V2X service for the UE. The NGAP message may include the V2X policy delivered to the UE as a NAS message. The V2X policy in the NGAP message is transparent to the BS.

Operation 5: When the NGAP message received in operation 4 includes a NAS message to be delivered to the UE, the BS transmits the NAS message to the UE. The NAS message includes the V2X policy to be transmitted to the UE. After receiving the NAS message from the BS, the UE may store values contained in the V2X policy in its context and apply the values for using the V2X service.

Operation 6: The UE may transmit a NAS message informing that the V2X policy has been well received. The NAS message is a response message to the NAS message constructed for delivery to the UE in operation 4. The message is delivered to the AMF via the BS.

Operation 7: The AMF may transmit to the PCF a response indicating that the V2X policy has been successfully delivered to the BS and the UE. Although the AMF uses a service operation Npcf PolicyControl Update to transmit the response to the PCF, it is also obvious that the service operation for transmitting a response indicating successful delivery of the V2X policy may be referred to by other names.

According to embodiments of the disclosure, a BS in a mobile communication network for providing V2X services may determine whether a UE is authorized to use a V2X service. Furthermore, according to embodiments of the disclosure, the BS in the mobile communication network for providing V2X services may provide radio resources to the UE by applying QoS information set with respect to a V2X service that the UE desires to use.

Furthermore, according to embodiments of the disclosure, the UE in the mobile communication network for providing V2X services may request radio resources from the BS based on the QoS information set with respect to a V2X service that the UE desires to use. In addition, when a policy for a vehicle communication service is changed, a network entity for providing a policy (i.e., authorization information and QoS information) for V2X communication may provide an updated policy to the UE and BS.

The effects that can be achieved from the disclosure are not limited to those that have been particularly described hereinabove, and other effects of the disclosure will be clearly understood by those of ordinary skill in the art from the following detailed description.

Figure 4:
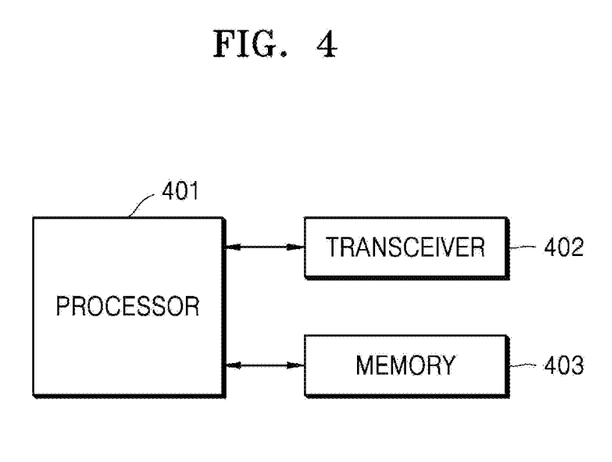
FIG. 4 illustrates a configuration of a terminal according to an embodiment of the disclosure.

FIG. 4 is a block diagram of a configuration of a UE according to an embodiment of the disclosure.

Referring to FIG. 4, the UE may include a processor 401, a transceiver 402, and a memory 403. However, components of the UE are not limited thereto. For example, the UE may include more or fewer components than those shown in FIG. 4. Furthermore, the processor 401, the transceiver 402, and the memory 403 may be implemented as a single chip.

The processor 401 may control a series of processes in which the UE may operate according to the embodiments of the disclosure. For example, the processor 401 may control the components of the UE to perform a method of providing information for a V2X service according to an embodiment of the disclosure. The processor 401 may be formed as at least one processor and perform operations of providing information for a V2X service according to the embodiments of the disclosure by executing a program stored in the memory 403.

The transceiver 402 may transmit or receive signals from or to a BS. The signals transmitted or received to or from the BS may include control information and data. The transceiver 402 may include a radio frequency (RF) transmitter for up-converting and amplifying a frequency of a signal to be transmitted and an RF receiver for low-noise amplifying a received signal and down-converting its frequency. However, this is merely an example of the transceiver 402, and the components of the transceiver 402 are not limited to the RF transmitter and the RF receiver. Furthermore, the transceiver 402 may receive a signal via a radio channel and output the signal to the processor 401 and transmit the signal output from the processor 401 via a radio channel.

The memory 403 may store data and programs necessary for operations of the UE. Furthermore, the memory 403 may store control information or data in a signal transmitted or received by the UE. The memory 403 may be composed of storage media, such as read-only memory, random access memory (RAM), hard disks, compact disc (CD)-read only memory (ROM), and digital versatile discs (DVDs), or a combination thereof. Furthermore, the memory 403 may be formed as a plurality of memories. The memory 403 may store a program for performing operations of providing information for a V2X service according to the embodiments of the disclosure.

Figure 5:
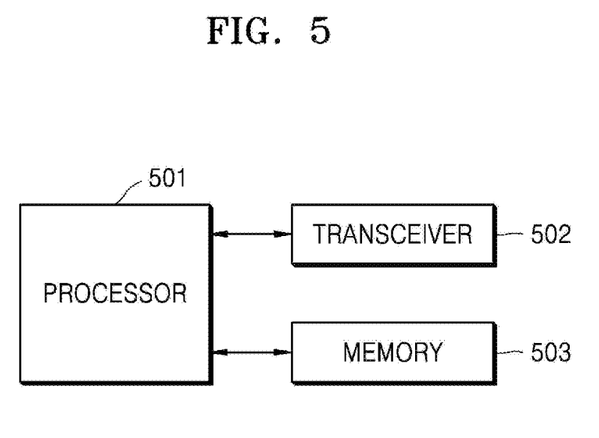
FIG. 5 illustrates a configuration of a network function (NF) according to an embodiment of the disclosure.

FIG. 5 illustrates a configuration of an NF according to an embodiment of the disclosure.

Referring to FIG. 5, the NF may include a processor 501, a transceiver 502, and a memory 503. However, components of the NF are not limited thereto. For example, the NF may include more or fewer components than those shown in FIG. 5. Furthermore, the processor 501, the transceiver 502, and the memory 503 may be implemented as a single chip. Furthermore, components of a BS may also be the same or correspond to components of the NF of FIG. 5.

The processor 501 may control a series of processes in which the NF may operate according to the embodiments of the disclosure. For example, the processor 501 may control the components of the NF to perform a method of providing information for a vehicle communication service according to an embodiment of the disclosure.

The transceiver 502 may transmit or receive signals from or to a UE or BS. The signals transmitted or received to or from the BS or UE may include control information and data. The transceiver 502 may include an RF transmitter for up-converting a frequency of a signal to be transmitted to a higher frequency and amplifying the resulting signal and an RF receiver for low-noise amplifying a received signal and down-converting its frequency to a lower frequency. However, this is merely an example of the transceiver 502, and the components of the transceiver 502 are not limited to the RF transmitter and the RF receiver. Furthermore, the transceiver 502 may receive a signal via a radio channel and output the signal to the processor 501 and transmit the signal output from the processor 501 via a radio channel. The processor 501 may be formed as a plurality of processors and perform a method of providing information for a vehicle communication service according to the embodiments of the disclosure by executing a program stored in the memory 503.

The memory 503 may store data and programs necessary for operations of the NF. Furthermore, the memory 503 may store control information or data in a signal transmitted or received by the NF. The memory 503 may be composed of storage media, such as ROM, RAM, hard disks, CD-ROM, and DVDs, or a combination thereof. Furthermore, the memory 503 may be formed as a plurality of memories. The memory 503 may store a program for performing a method of providing information for a vehicle communication The methods according to the embodiments of the disclosure described in claims or specification thereof may be implemented in hardware, software, or a combination of hardware and software.

When the methods are implemented in software, a computer-readable storage medium storing at least one program (software module) may be provided. The at least one program stored in the computer-readable storage medium is configured for execution by at least one processor within an electronic device. The at least one program includes instructions that cause the electronic device to execute the methods according to the embodiments of the disclosure described in the claims or specification thereof.

The program (software module or software) may be stored in a RAM, a non-volatile memory including a flash memory, ROM, electrically erasable programmable ROM (EEPROM), a magnetic disc storage device, CD-ROM, DVDs or other types of optical storage devices, and a magnetic cassette. Alternatively, the program may be stored in a memory that is configured as a combination of some or all of the memories. A plurality of such memories may be included.

Furthermore, the program may be stored in an attachable storage device that may be accessed through communication networks such as the Internet, Intranet, a local area network (LAN), a wide LAN (WLAN), and a storage area network (SAN) or a communication network configured in a combination thereof. The storage device may access a device performing methods according to the embodiments of the disclosure through an external port. Further, a separate storage device on the communication network may also access a device performing methods according to the embodiments of the disclosure.

In the embodiments of the disclosure, a component included in the disclosure is expressed in a singular or plural form depending on the described embodiments of the disclosure. However, singular or plural expressions are selected to be suitable for the presented situations for convenience, and the disclosure is not limited to the singular or plural form. An element expressed in a plural form may be configured as a single element, or an element expressed in a singular form may be configured as a plurality of elements.

According to embodiments of the disclosure, a method and apparatus for effectively providing a V2X service in a mobile communication system are provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by an access and mobility management function (AMF), of providing information for a vehicle-to-everything (V2X) service, the method comprising:
    receiving, from a user equipment (UE), a registration request message including information indicating that the UE is a V2X terminal;
    receiving, from a unified data management (UDM), subscription information about whether the UE is able to use the V2X service;
    based on the registration request message and the subscription information, selecting a policy control function (PCF) supporting the V2X service;
    receiving V2X policy information from the selected PCF; and
    providing the V2X policy information to a base station.

2. The method of claim 1, further comprising establishing a policy association with the selected PCF.

3. The method of claim 1, further comprising:
    based on the subscription information received from the UDM, determining whether the UE is allowed to receive the V2X service,
    wherein the subscription information comprises authorization information indicating whether the UE is authorized to use the V2X service.

4. The method of claim 1, wherein the providing of the V2X policy information to the base station comprises providing the V2X policy information to the base station by using a next-generation application protocol (NGAP).

5. The method of claim 1,
    wherein the selecting of the PCF comprises:
        transmitting a message requesting a network repository function (NRF) to discover a PCF supporting the V2X service;
        receiving information about the PCF from the NRF; and
        selecting the PCF discovered by the NRF, and
    wherein the message requesting the discovery of the PCF comprises an indication of support of the V2X service.

6. The method of claim 1, further comprising: receiving updated V2X policy information from the PCF; storing the updated V2X policy information as part of context information of the UE; and providing the updated V2X policy information to the base station.

7. The method of claim 1,
    wherein the V2X policy information provided to the base station comprises at least one of quality of service (QoS) parameter information or V2X authorization information, and
    wherein the QoS parameter information comprises at least one of identification information of the V2X service or a PC5 QoS parameter.

8. A method, performed by a policy control function (PCF), of providing information for a vehicle-to-everything (V2X) service, the method comprising:
    establishing a policy association with an access and mobility management function (AMF);
    generating V2X policy information; and
    providing the generated V2X policy information to the AMF,
    wherein the PCF is selected as a PCF supporting the V2X service, by the AMF, based on a registration request message of a user equipment (UE) and subscription information about whether the UE is able to use the V2X service, and wherein the registration request message includes information indicating that the UE is a V2X terminal.

9. The method of claim 8,
    wherein the V2X policy information comprises at least one of quality of service (QoS) parameter information or V2X authorization information, and
    wherein the QoS parameter information comprises at least one of identification information of the V2X service or a PC5 QoS parameter.

10. The method of claim 8, further comprising:
    updating the V2X policy information; and
    providing the updated V2X policy information to the AMF.

11. An access and mobility management function (AMF) for providing information for a vehicle-to-everything (V2X) service, the AMF comprising:
    a transceiver; and
    a processor electrically connected to the transceiver and configured to:
        receive, from a user equipment (UE), a registration request message including information indicating that the UE is a V2X terminal,
        receive, from a unified data management (UDM), subscription information about whether the UE is able to use the V2X service,
        based on the registration request message and the subscription information, select a policy control function (PCF) supporting the V2X service,
        receive V2X policy information from the selected PCF, and
        provide the V2X policy information to a base station.

12. The AMF of claim 11, wherein the processor is further configured to establish a policy association with the selected PCF.

13. The AMF of claim 11,
    wherein the processor is further configured to, based on the subscription information received from the UDM, determine whether the UE is allowed to receive the V2X service, and
    wherein the subscription information comprises authorization information indicating whether the UE is authorized to use the V2X service.

14. The AMF of claim 11, wherein the processor is further configured to provide the V2X policy information to the base station by using a next-generation application protocol (NGAP).

15. The AMF of claim 11,
    wherein, as at least part of the selecting of the PCF, the processor is further configured to:
        transmit a message requesting a network repository function (NRF) to discover a PCF supporting the V2X service,
        receive information about the PCF from the NRF, and
        select the PCF discovered by the NRF, and
    wherein the message requesting the discovery of the PCF comprises an indication of support of the V2X service.

16. The AMF of claim 11, wherein the processor is further configured to: receive updated V2X policy information from the PCF, store the updated V2X policy information as part of context information of the UE, and provide the updated V2X policy information to the base station.

17. The AMF of claim 11,
    wherein the V2X policy information provided to the base station comprises at least one of quality of service (QoS) parameter information or V2X authorization information, and wherein the QoS parameter information comprises at least one of identification information of the V2X service or a PC5 QoS parameter.

18. A policy control function (PCF) for providing information for a vehicle-to-everything (V2X) service, the PCF comprising:
- a transceiver; and
- a processor electrically connected to the transceiver and configured to:
    - establish a policy association with an access and mobility management function (AMF),
    - generate V2X policy information, and
    - provide the generated V2X policy information to the AMF,
- wherein the PCF is selected as a PCF supporting the V2X service, by the AMF, based on a registration request message of a user equipment (UE) and subscription information about whether the UE is able to use the V2X service, and
- wherein the registration request message includes information indicating that the UE is a V2X terminal.

19. The PCF of claim 18,
- wherein the V2X policy information comprises at least one of quality of service (QoS) parameter information or V2X authorization information, and
- wherein the QoS parameter information comprises at least one of identification information of the V2X service or a PC5 QoS parameter.

20. The PCF of claim 18, wherein the processor is further configured to:
- update the V2X policy information, and
- provide the updated V2X policy information to the AMF.

* * * * *